United States Patent
Kashyap et al.

(10) Patent No.: US 8,001,402 B2
(45) Date of Patent: Aug. 16, 2011

(54) METHOD FOR POWER CAPPING WITH CO-OPERATIVE DYNAMIC VOLTAGE AND FREQUENCY SCALING VIA SHARED P-STATE TABLE

(75) Inventors: Vivek Kashyap, Beaverton, OR (US); Charles R Lefurgy, Austin, TX (US); Dipankar Sarma, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 832 days.

(21) Appl. No.: 11/950,543

(22) Filed: Dec. 5, 2007

(65) Prior Publication Data

US 2009/0150693 A1    Jun. 11, 2009

(51) Int. Cl.
*G06F 1/32* (2006.01)
(52) U.S. Cl. .................................. 713/320; 713/300
(58) Field of Classification Search .................. 713/320, 713/300
See application file for complete search history.

(56) References Cited

U.S. PATENT DOCUMENTS

| | | | |
|---|---|---|---|
| 6,845,456 B1 | 1/2005 | Menezes et al. | |
| 6,889,332 B2 | 5/2005 | Helms et al. | |
| 7,051,215 B2* | 5/2006 | Zimmer et al. | 713/300 |
| 7,111,179 B1 | 9/2006 | Girson et al. | |
| 7,418,608 B2* | 8/2008 | Kumar et al. | 713/320 |
| 7,747,881 B2* | 6/2010 | Duran et al. | 713/300 |
| 2003/0221133 A1 | 11/2003 | Nguyen et al. | |

\* cited by examiner

*Primary Examiner* — Albert Wang
(74) *Attorney, Agent, or Firm* — Garg Law Firm, PLLC; Rakesh Garg; Libby Z. Toub

(57) ABSTRACT

A co-operative mechanism in which a service processor and a host CPU (with an as running thereupon) work together to implement both power capping and utilization-based power savings, and with negligible side effects. Preferably, a 2-level modulation scheme is employed to undertake both power capping and energy savings simultaneously. Preferably, a frequency governor in the as running on a host processor saves power by modulating p-states based on a shared table, thus avoiding SMIs. The range of the p- I states in the shared table is adjusted to implement power capping in conjunction with power sensors in the system. This adjustment can be done either by a service processor, which can monitor total energy consumption, or an as or software running on the host processor, which can read energy consumption from the service processor and adjust the shared table.

20 Claims, 3 Drawing Sheets

METHOD FOR POWER CAPPING WITH CO-OPERATIVE DYNAMIC VOLTAGE AND FREQUENCY SCALING VIA SHARED P-STATE TABLE

FIELD OF THE INVENTION

The present invention relates generally to methods and arrangements for power consumption management in computers.

BACKGROUND OF THE INVENTION

Power consumption management is now a common feature in all computing platforms, from mobile devices to servers. One feature commonly used in managing power consumption is that of dynamic voltage and frequency scaling. Many modern processors support this to allow better control over power management.

Particularly, since power—as consumed—is proportional to $V^2f$, it is the case that by reducing voltage, significant savings in power consumption can be achieved. However, voltage reduction for this purpose sometimes requires a reduction in frequency.

Typically, this is reflected in a table of states in which processors run. For example, central processing units (CPUs) manufactured by Intel which support Speedstep® technology have a number of p-states each defining a voltage and frequency. P-states tend to be labeled with numbers in ascending order in an inversely proportional relationship to the speed of the clock frequency; thus a lower-numbered p-state should be understood herein as high p-state and relating to faster clock frequencies while a higher-numbered p-state should be understood herein as relating to low p-state relating to slower clock frequencies. The CPUs can run at any of these defined p-states. A common method for deciding on the p-state for running the CPU is to look at the utilization of the CPU. If the CPU is relatively lightly utilized, such a method lowers the p-state even though it means reducing the CPU frequency; the lowering of the p-state, indeed, will have less effect on the overall throughput. The other common methods for deciding on p-states include policy-driven setting of p-states (e.g., due to a "conserve power" mode set by a systems management software) and an application software program determining p-states based on its computing requirements. These methods reduce energy consumption in the system.

Another power management feature, of course, involves the capability of data centers to budget or limit power consumption. This is often done using clock throttling (since it is faster than p-state change). However, clock throttling presents a limited ability to reduce power consumption; it does so linearly, as opposed to quadratically (more appropriate for voltage scaling). Thus, it becomes necessary to use p-state changes to implement low power caps.

Recently developed systems have sophisticated power sensors to monitor power consumption, and these sensors are accessible from the service processors (system management processors) of the system. If one is actually to implement both power capping and a frequency governor (utilization-based, application driven or any other frequency governor as described above), the most straightforward approach would be to have a common entity (i.e., service processors) implement both so that the p-states are controlled by one entity. However, on some platforms, the p-state change can be undertaken only by the host processor itself, such that the service processors therefore must use costly interrupt mechanisms like Systems Management Interrupts (SMIs) to change the power state in the host processors. Long running SMIs increase the latency of the user programs since SMI handlers are outside the purview of the OS and are non-preemptible. SMIs also stall all CPUs in the system, thereby making it very intrusive and expensive.

Accordingly, a compelling need has been recognized in connection with providing methods and arrangements for providing both power capping and frequency governor-based power savings in a workable and efficient manner.

SUMMARY OF THE INVENTION

In accordance with at least one presently preferred embodiment of the present invention, there is broadly contemplated herein a co-operative mechanism in which a service processor and the host CPU (with an OS running thereupon) work together to implement both power capping and frequency governor based power savings, and with negligible side effects.

In summary, one aspect of the invention provides an apparatus for providing power management in a computer system, the apparatus comprising: a sensing arrangement which senses power consumption and compares power consumption to a predetermined limit; a monitoring arrangement which monitors at least one entity acting to set host processor p-states; the monitoring arrangement acting to modulate host processor p-states; and a p-state table shared between the sensing arrangement and the monitoring arrangement.

Another aspect of the invention provides a method of providing power management in a computer system, the method comprising the steps of: sensing power consumption and comparing power consumption to a predetermined limit; monitoring a directive acting to set host processor p-states; the monitoring step comprising modulating host processor p-states; and sharing a p-state table commonly in the sensing and monitoring steps.

Furthermore, an additional aspect of the invention provides a program storage device readable by machine, tangibly embodying program of instructions executable by the machine to perform a method of providing power management in a computer system, the method comprising the steps of: sensing power consumption and comparing power consumption to a predetermined limit; monitoring a directive acting to set host processor p-states; the monitoring step comprising modulating host processor p-states; and sharing a p-state table commonly in the sensing and monitoring steps.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

Figure 1:
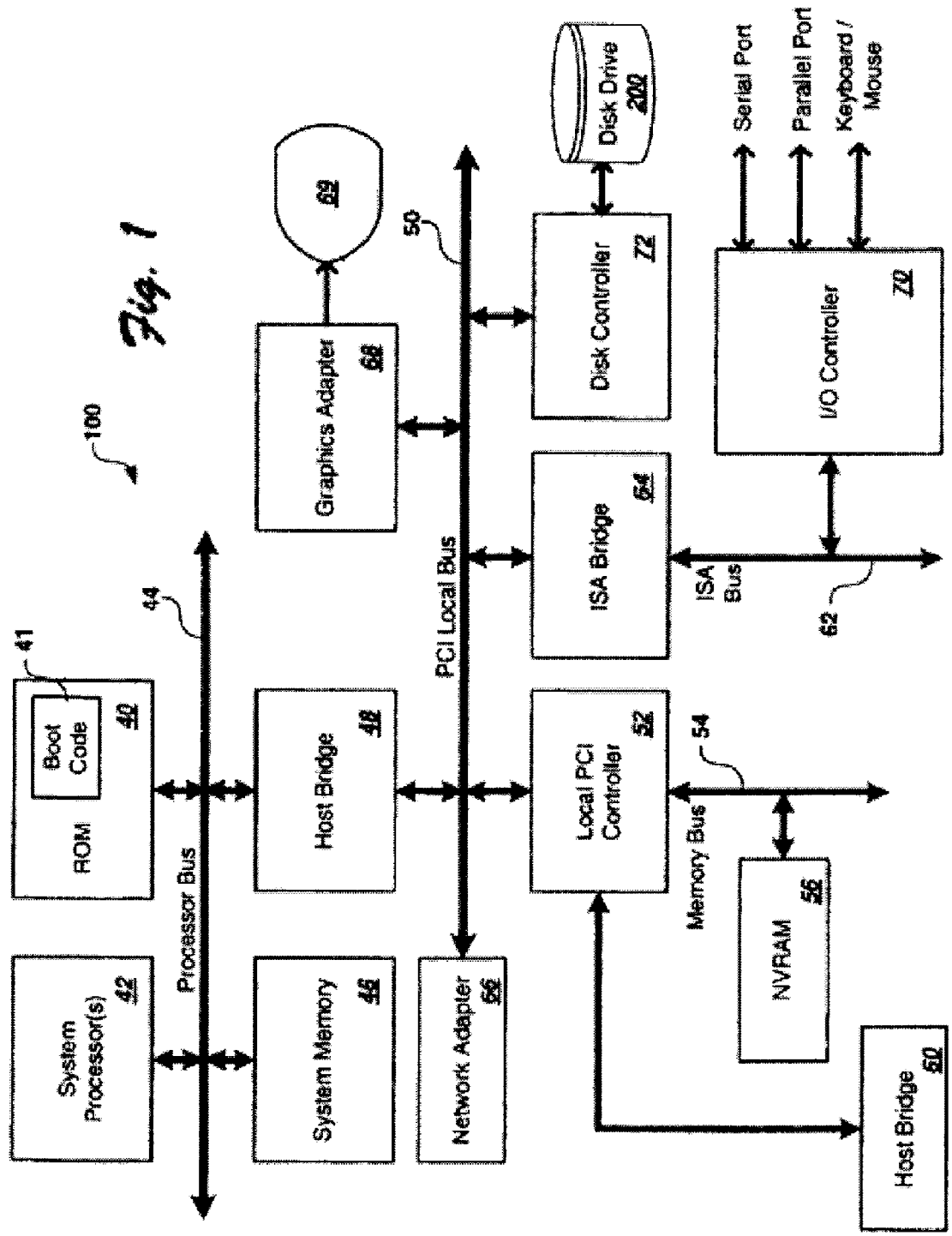
FIG. 1 schematically illustrates a first computer system.
Figure 2:
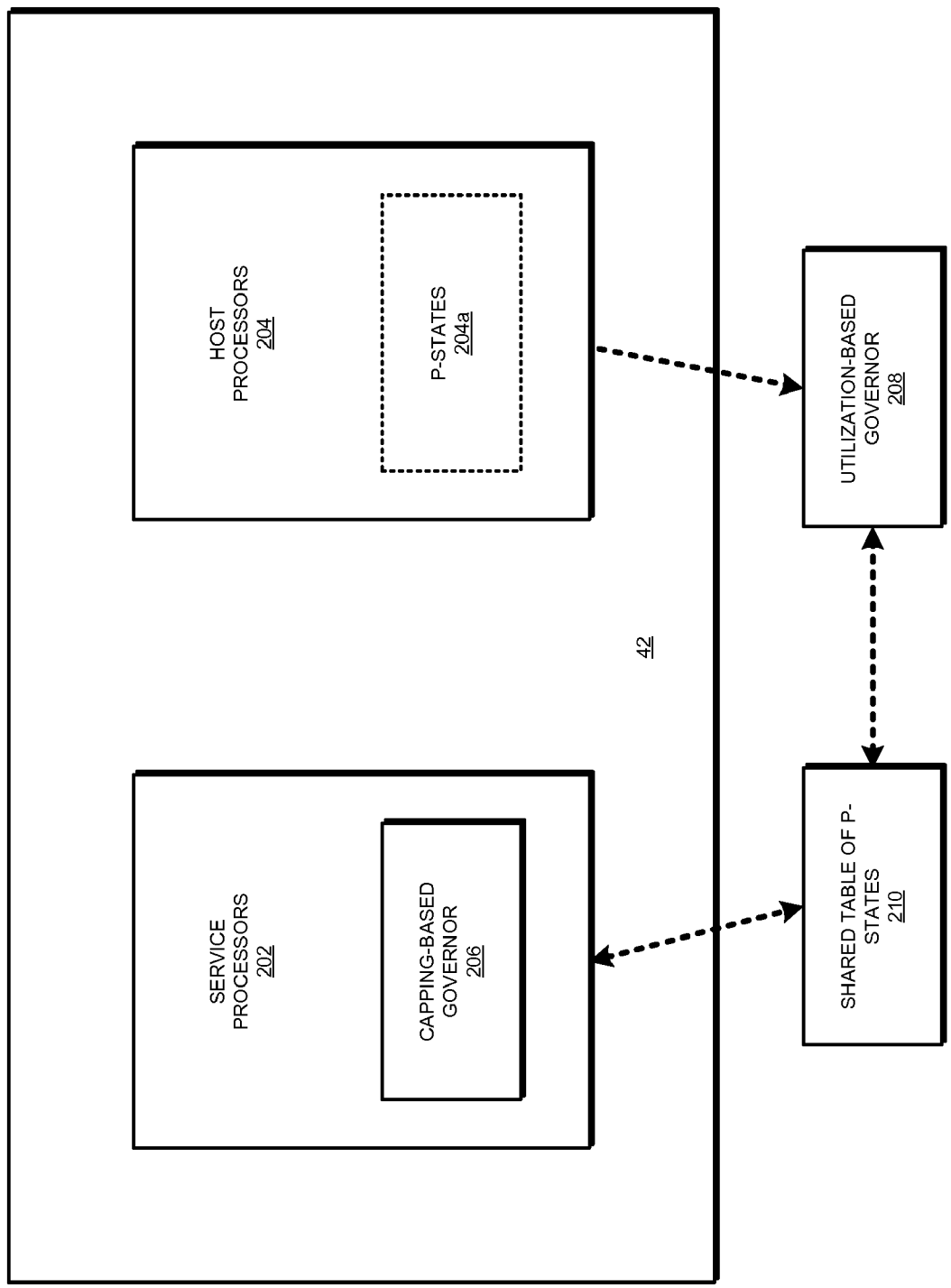
FIG. 2 schematically depicts system processors and components related thereto.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 and 2, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

Referring now to FIG. 1, there is depicted a block diagram of an illustrative embodiment of a computer system 12. The illustrative embodiment depicted in FIG. 1 may be a notebook computer system, such as one of the ThinkPad® series of personal computers previously sold by the International Business Machines Corporation of Armonk, N.Y., and now sold by Lenovo (US) Inc. of Morrisville, N.C.; however, as will become apparent from the following description, the present invention is applicable to any data processing system. Notebook computers, as may be generally referred to or understood herein, may also alternatively be referred to as "notebooks", "laptops", "laptop computers" or "mobile computers".

As shown in FIG. 1, computer system 12 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to a LAN, and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard and mouse. In addition, I/O controller 70 supports external communication by computer system 12 via serial and parallel ports. A disk controller 72 is in communication with a disk drive 200. Of course, it should be appreciated that the system 12 may be built with different chip sets and a different bus structure, as well as with any other suitable substitute components, while providing comparable or analogous functions to those discussed above.

As will further be appreciated herebelow, in accordance with a presently preferred embodiment of the present invention, a 2-level modulation scheme is employed to undertake both power capping and energy savings simultaneously. Preferably, a frequency governor in the OS running on a host processor saves power by modulating p-states based on a shared table, thus avoiding SMIs. The range of the p-states in the shared table is adjusted to implement power capping in conjunction with power sensors in the system. This adjustment can be done either by the service processors, which can monitor total energy consumption, or an OS or software running on the host processors, which can read energy consumption from the service processors and adjust the shared table.

Alternatively, system management software can implement power capping by adjusting the shared table through suitable interfaces both in-band (through the OS) or out-of-band. (An example is shown and described herein with respect to FIG. 3.) Methods as broadly contemplated herein in accordance with at least one embodiment of the present invention can work with modem platforms that have the ability to check the consumption of power.

FIG. 2 illustrates that system processors 42 may include service processors 202 and host processors 204. Essentially, there are two entities in typical power managed systems. First, there is an entity sensing the consumption of power and taking action if a user-specified limit is exceeded. This is typically one of the service processors 202 in the platform, and for the present discussion it may be referred to as a capping-based governor 206. Next, there is typically an entity which monitors the utilization of the host processors 204 by the workload running in the system; such an entity could be embodied by essentially any suitable component, such as a Linux OS cpufreq driver using an "on-demand" governor. This entity will, based on such utilization, modulate the p-states 204a of the host processors 204 to reduce power consumption; for the present discussion, this may be referred to as a utilization-based governor 208. However, it should be understood that a "utilization-based" governor is provided here as but one illustrative and non-restrictive example, and that a wide variety of governors can be employed for the purpose at hand. For instance, application software can drive p-states through a "userspace" governor for example; that is, if an application is doing low-priority or unimportant work, it may choose to lower the p-state even if the CPU utilization is high. Essentially, the embodiments of the present invention can employ just about any frequency-based governor (as component 208) as long as the governor obeys the shared p-state table 210.

Preferably, in accordance with at least one preferred embodiment of the present invention, a table of p-states 210 is implemented that is actually shared by the two entities just described (the capping-based governor 206 and the utilization-based governor 208). The shared table 210 may include just the upper (or higher) and lower limits (corresponding to faster and slower clock frequencies, respectively) on the p-states 204a, or all the valid p-states. The utilization-based governor 208 preferably runs on a host processor 204 and validates each p-state change by utilizing the shared table 210, and goes on to change a p-state based on processor utilization. The capping-based governor 206, on the other hand, preferably monitors the energy consumption in the system and does not interfere with the utilization-based governor 208 as long as the system is within a power consumption limit as defined by the system administrator.

Should the power consumption limit be reached, however, the capping-based governor 306 preferably changes the shared table 210 by removing one or more higher (i.e., faster) p-states or by lowering the highest (fastest) p-state (i.e., causing frequency to be slower) if a range is being used in the shared table. This forces the utilization-based governor 208 to use lower (slower) p-states than it would normally use and therefore reduce power consumption significantly, eventually bringing the system under the defined power limit. Thus, modulation of the p-states occurs at two levels.

There are number of ways that a shared table of p-states 210 can be realized in accordance with at least one embodiment of the present invention. For instance, service processors 202 can change the shared table 210 in host memory and use an interrupt to inform a host processors 204. Alternatively, the service processors 202 can use an in-band command to communicate an update to the shared p-state table 210. In yet another variant, the service processors 202 could simply interrupt the host processors 204 upon reaching the power limit, wherein an interrupt handler could read the change request from the service processor (e.g., using one or more registers in the service processor) and update the shared p-state table 210.

The capping-based governor 206 can conceivably run either on the service processors 202 or the host processors 204 of the system. On the other hand, the utilization-based governor 208 preferably runs on the host processors 204 of the system; this eliminates the need to use costly interrupts (e.g., SMIs on Intel platforms) for every p-state change required by the two governors 206/208.

By way of advantages attained in accordance with at least one embodiment of the present invention, conventional efforts simply do not address all the issues resolved herein, e.g., the use of p-states to limit power consumption (as opposed to just clock throttling), running the two governors on two different hardware entities as often demanded by more recent platforms, avoiding costly interrupts (e.g., SMIs on Intel platforms) to change p-states in the utilization-based governor, providing flexibility use the same technique with or without service processors, etc.

Generally, the embodiments of the present invention afford the flexibility of power limit capability to be able to be implemented either in a service processor or in-band through the host processor. On systems with relatively fewer resources in service processors, one can avoid overloading the service processors. Further, it is to be noted that often an OS is in a better position to gather utilization statistics than service processors. The methods and arrangements according to at least one presently preferred embodiment of the present invention permit the utilization-based governor to run within an OS in co-operation with service processors.

Figure 3:
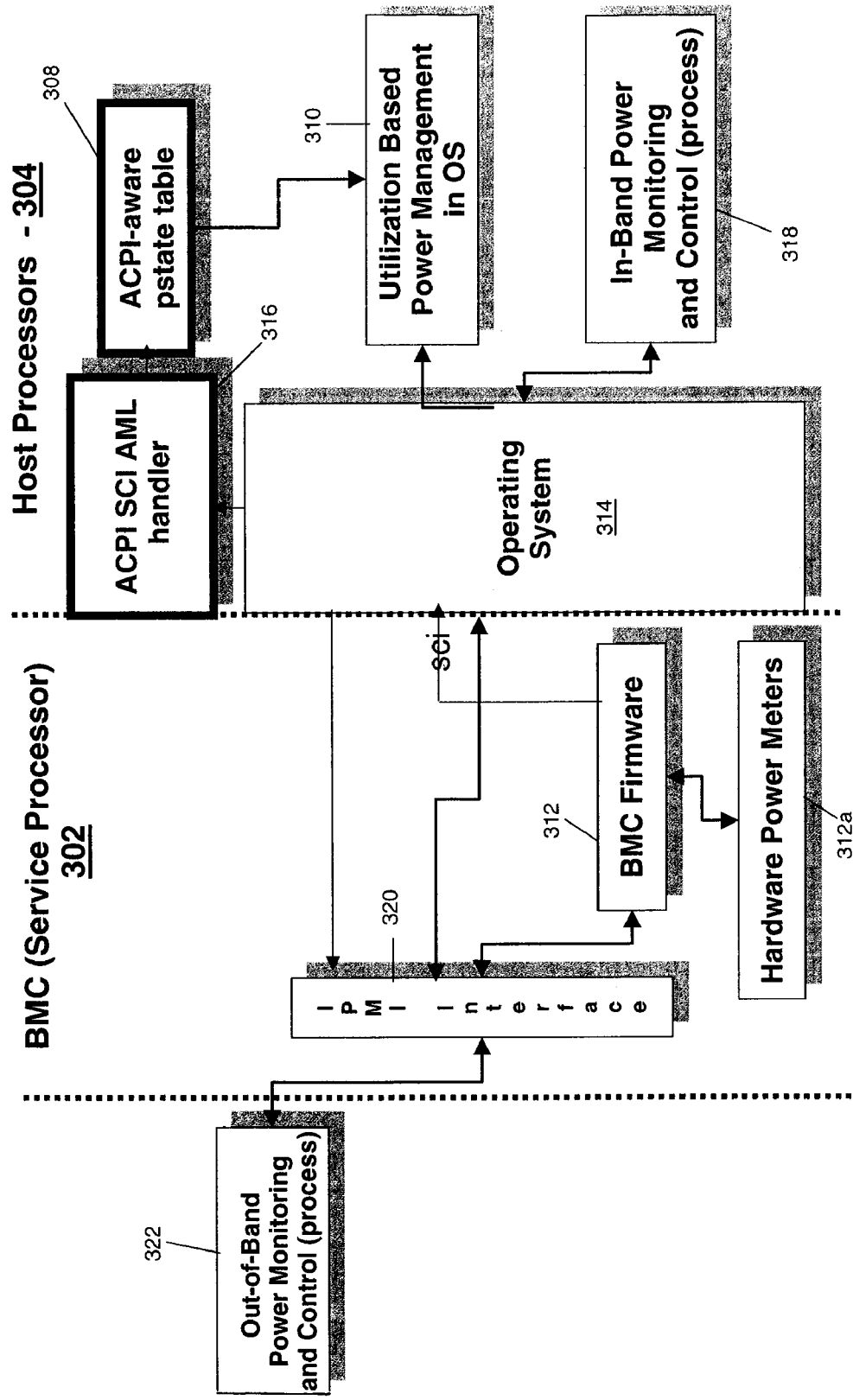
FIG. 3 schematically illustrates a second computer system embodiment.

FIG. 3 provides a schematic illustration of another embodiment of the present invention. Whereas FIG. 1 relates to a notebook/laptop computer, FIG. 3 relates to a server computer (an application which, in general, of course may employ the embodiments of the present invention. As such, the server computer design contemplated in accordance with FIG. 3, by way of one non-restrictive and illustrative example, could be from IBM's System X series of servers—they use a service processor named BMC (Baseboard Management Controller).

In the embodiment of FIG. 3, a low priority interrupt is employed; here it is shown as an SCI, which would represent a great cost savings in comparison with SMIs (which tend to stall or create a drag on all CPUs for every SMI). Preferably, from service processor 302 (specifically from BMC firmware 312, itself in communication with hardware power meters 312a), the SCI may poke a host system ROM (e.g., in OS 314) whenever the service processor 302 detects power consumption reaching the power cap. Along with the interrupt, the service processor 302 also preferably communicates those changes that need to be made in the shared p-state table (e.g., how many "high" (fast) p-states are to be removed). The host processor 304 (conceivably a OS [312] and ACPI BIOS [316] together) preferably obeys those commands (e.g., removes p-states if so commanded by the BMC service processor 302) while the utilization governor 310 running in the OS 314 re-validates with the new p-state table. Preferably, the service processor 302 may similarly act (add higher, i.e., faster, p-states) if power consumption falls significantly below the predetermined power cap.

In a variant embodiment, the p-state table 308 can be manipulated as just described but on a shared area in memory, to which both the service processor 302 and the host processor 304 have access. Preferably, the host processor's utilization governor 310 will periodically validate to factor in any updates to the shared p-state table 308 by the service processor.

Whereas the processes just described with regard to FIG. 3 entail an in-band power monitoring and control (symbolically indicated at 318), FIG. 3 also conveys the concept of an out-of-band control process 320 (as initially referred to further above) of the shared p-state table. In such a case, generally, the BMC or service processor 302 will provide the same messaging interfaces (e.g., IPMI, or intelligent platform management interface 320) to a host CPU as well as to an external computer connected to the same network as the BMC 302. An external computer, therefore, can send IPMI commands to the BMC 302 which in turn can take various actions like setting the power cap or even setting up the shared p-state table.

By way of further elucidation on advantages that are enjoyed in accordance with at least one presently preferred embodiment of the present invention, it may be considered that a BMC or analogous component is operating on a slow timescale (e.g., as a slow 30 MHz processor) and updates the host processor frequency only a few times per second, since that would be all that is required to control the power cap over the time constraints required by power supplies (i.e., power consumption must settle to the cap certainly within a few seconds). However, the host OS could be changing the application every few milliseconds, and the utilization governor can react at that speed.

Since the utilization governor potentially changes the CPU frequency hundreds of times a second, it makes sense to put this in the host processor so that the system is not interrupted so often by the BMC. Accordingly, in accordance with at least one presently preferred embodiment of the present invention, changes from both the BMC capping controller and utilization governor can be resolved by using the standard ACPI interface, thus allowing the OS to "see" all changes to the frequency and keep better track of time. In all, this helps guarantee scheduling fairness.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus for providing power management in a computer system, said apparatus comprising:
   a sensing arrangement which senses power consumption and compares power consumption to a predetermined limit;
   a monitoring arrangement which monitors at least one entity acting to set host processor p-states;
   said monitoring arrangement acting to modulate host processor p-states; and
   a p-state table shared between said sensing arrangement and said monitoring arrangement, wherein the monitoring arrangement acts to modulate the host processor p-states by referencing the p-states available in the p-state table, and wherein responsive to a breach of the predetermined limit, said sensing arrangement changes said p-state table by one of (i) removing a higher p-state from the p-state table and forcing the monitoring arrangement to select a lower p-state, and (ii) lowering a higher p-state limit in the p-state table and forcing the monitoring arrangement to select a lower p-state.

2. The apparatus according to claim 1, wherein said sensing arrangement acts to cap power consumption based on a comparison of power consumption to the predetermined limit.

3. The apparatus according to claim 1, wherein said p-state table includes all valid host processor p-states.

4. The apparatus according to claim 1, wherein said monitoring arrangement acts to said monitoring arrangement acts to:
   monitor host processor utilization; and
   modulate host processor p-states based on monitored host processor utilization.

5. The apparatus according to claim 1, wherein said monitoring arrangement acts to modulate host processor p-states based on a predetermined energy saving policy.

6. The apparatus according to claim 1, wherein said monitoring arrangement runs on a system host processor.

7. The apparatus of claim 1, further comprising:
   the sensing arrangement interrupting the host processor upon changing the p-state table;
   and the monitoring arrangement causing the modulating to occur according to the changed p-state table.

8. The apparatus of claim 1, further comprising:
   the sensing arrangement transmitting an in-band command to communicate a change to the p-state table.

9. The apparatus of claim 1, further comprising:
   the sensing arrangement interrupting the host processor upon reaching the predetermined limit;
   an interrupt handler reading a request from the sensing arrangement to change the p-state table; and
   the interrupt handler changing the p-state table responsive to the request.

10. The apparatus of claim 1, further comprising:
    an external computer in communication with the sensing arrangement of the computer system, wherein the external computer instructs the sensing arrangement to change the p-state table.

11. A method of providing power management in a computer system, said method comprising:
    sensing power consumption in the computer system;
    comparing power consumption to a predetermined limit;
    monitoring a directive acting to set host processor p-states;
    said monitoring comprising modulating host processor p-states; and
    sharing a p-state table for sensing and monitoring, wherein the modulating the host processor p-states occurs by referencing the p-states available in the p-state shared table, and wherein responsive to a breach of the predetermined limit, and sensing changing said p-state table by one of (i) removing a higher p-state from the p-state table and forcing the monitoring arrangement to select a lower p-state, and (ii) lowering a higher p-state limit in the p-state table and forcing the monitoring arrangement to select a lower p-state.

12. The method according to claim 11, wherein:
    said modulating step comprises monitoring host processor utilization; and
    said modulating comprises modulating host processor p-states based on host processor utilization.

13. The method according to claim 11, wherein said modulating step comprises modulating host processor p-states based on a predetermined energy saving policy.

14. The method according to claim 11, wherein said sensing step comprises capping power consumption based on a comparison of power consumption to the predetermined limit.

15. The method according to claim 11, wherein said sharing step comprises sharing a p-state table which includes all valid host processor p-states.

16. The method according to claim 11, wherein said modulating step comprises Changing a p-state based on monitored host processor utilization or any other policy.

17. The method of claim 11, further comprising:
    interrupting the host processor upon changing the p-state table such that the modulating occurs according to the changed p-state table.

18. The method according to claim 16, wherein said changing step comprises lowering a higher p-state limit.

19. A program storage device readable by machine, tangibly embodying program of instructions executable by the machine to perform a method of providing power management in a computer system, said method comprising the steps of:
    sensing power consumption and comparing power consumption to a predetermined limit;
    monitoring a directive acting to set host processor p-states;

said monitoring step comprising modulating host processor p-states; and sharing a p-state table commonly in said sensing and monitoring steps.

20. A computer usable program product comprising a computer usable non-transitory medium including computer usable code for power management in a computer system, the computer usable code when executed causing a performance of computer operations comprising:

sensing power consumption and comparing power consumption to a predetermined limit; monitoring a directive acting to set host processor p-states; said monitoring step comprising modulating host processor p-states; and sharing a p-state table for sensing and monitoring, wherein the modulating the host processor p-states occurs by referencing the p-states available in the p-state shared table, and wherein responsive to a breach of the predetermined limit, said sensing changing said p-state table by one of (i) removing a higher p-state from the p-state table and forcing the monitoring arrangement to select a lower p-state, and (ii) lowering a higher p-state limit in the p-state table and forcing the monitoring arrangement to select a lower p-state.

* * * * *